(12) United States Patent
Yong et al.

(10) Patent No.: US 8,112,844 B2
(45) Date of Patent: Feb. 14, 2012

(54) HINGE MECHANISM FOR A PORTABLE DEVICE

(75) Inventors: Seah Seang Yong, Singapore (SG); Kin Fui Chong, Singapore (SG); Wei Lit Leung, Singapore (SG)

(73) Assignee: Creative Technology Ltd, Singapore (SG)

( * ) Notice: Subject to any disclaimer, the term of this patent is extended or adjusted under 35 U.S.C. 154(b) by 302 days.

(21) Appl. No.: 12/581,332

(22) Filed: Oct. 19, 2009

(65) Prior Publication Data

US 2011/0088218 A1    Apr. 21, 2011

(51) Int. Cl.
   *E05D 11/06* (2006.01)
(52) U.S. Cl. ............. 16/357; 16/367; 16/239; 16/361
(58) Field of Classification Search ............ 16/358, 16/359, 360, 361, 239, 242, 357, 352, 353, 16/362, 364, 367; 455/575.4, 575.3; 379/433.01, 379/433.12, 433.13; 361/679.05, 679.27, 361/679.13, 679.56
See application file for complete search history.

(56) References Cited

U.S. PATENT DOCUMENTS

| | | | | |
|---|---|---|---|---|
| 7,380,313 B2 * | 6/2008 | Akiyama et al. | ............. | 16/367 |
| 7,467,000 B2 * | 12/2008 | Shiba | ............. | 455/575.8 |
| 7,650,671 B2 * | 1/2010 | Lee | ............. | 16/362 |
| 7,716,786 B2 * | 5/2010 | Shen | ............. | 16/239 |
| 7,870,645 B2 * | 1/2011 | Kim | ............. | 16/366 |
| 2006/0030381 A1 * | 2/2006 | Byun et al. | ............. | 455/575.4 |
| 2006/0137141 A1 * | 6/2006 | Kuramochi | ............. | 16/330 |
| 2007/0186380 A1 * | 8/2007 | Kim et al. | ............. | 16/239 |
| 2008/0161075 A1 * | 7/2008 | Kim et al. | ............. | 455/575.4 |
| 2009/0036181 A1 * | 2/2009 | Lee | ............. | 455/575.4 |
| 2009/0126158 A1 * | 5/2009 | Jian | ............. | 16/387 |
| 2009/0183341 A1 * | 7/2009 | Chuan | ............. | 16/358 |
| 2009/0286580 A1 * | 11/2009 | Murakoso et al. | ............. | 455/575.4 |
| 2010/0285852 A1 * | 11/2010 | Stephenson | ............. | 455/575.4 |
| 2010/0309135 A1 * | 12/2010 | Chen et al. | ............. | 345/169 |

FOREIGN PATENT DOCUMENTS

JP    2008128390 A  *  6/2008
JP    2009097550 A  *  5/2009

* cited by examiner

*Primary Examiner* — Chuck Y. Mah

(57) ABSTRACT

A hinge having a base with a planar surface; a sliding plate having a planar surface; a revolving member located adjacent to a longitudinal edge of the base, the revolving member being capable of revolving and projecting from the base; a dampener located in the base for restraining movement of the revolving member to retain the revolving member in its revolved and projected position; a first joint for coupling the revolving member to the sliding plate, and a plurality of guides arranged longitudinally and transversely in the sliding plate, wherein in a first mode of operation, the sliding plate is slidable over the base in the longitudinal or transverse directions of the base, wherein in a second mode of operation, the sliding plate is substantially slid over the base to a position in the transverse direction of the base, the sliding plate is pivotable about the longitudinal edge of the base to a configuration such that the planar surface of the sliding plate forms an oblique angle relative to the planar surface of the base.

13 Claims, 7 Drawing Sheets

HINGE MECHANISM FOR A PORTABLE DEVICE

FIELD OF INVENTION

The present invention relates to a hinge mechanism for a portable device.

BACKGROUND

There are generally four main types of casing designs for portable devices such as mobile phones. The four main types of casing designs are candy bar, flip, slider and swivel designs.

Candy bar phones only have one usage configuration compared to, for instance, flip phones, which have two configurations, a flipped configuration and a non-flipping configuration. Candy bar phones are not designed for hands free viewing of the screen. If one wishes to view the screen without holding the phone in his/her hands, the phone needs to lie flat and face up on a surface or lean against an object and be positioned at an angle facing the user.

With regard to slider phones, where a top part of the phone is capable of sliding over a bottom part of the phone, it has been observed that the hinge mechanisms involved are restricted to at most two dimensional movements along the main plane of the phone. There has so far been little or no innovation on such hinge mechanisms to allow other types of movements to enable more usage configurations. Similarly, slider phones are not designed for hands free viewing of the screen. If one wishes to view the screen without holding a slider phone in his/her hands, the phone needs to lie flat and face up on a surface or lean against an object and be positioned at an angle facing the user.

With regard to flip phones, where a top part of the phone is pivotable about a bottom part of the phone, an observation is that the main display is typically accessible only by flipping the phone open in a portrait configuration (i.e. with the major length of the screen being vertical). Use of flip phones may be inconvenient in the sense that the main display is not located on the front side of the phone for viewing and the user needs to flip the phone open to view the main display.

As for swivel phones, where a top part of the phone can be swiveled about an axis normal to the planar surface of a bottom part of the phone, some users find it awkward to swivel the phone, the usage of other phone designs appear to be more direct and intuitive.

A need therefore exists to provide a hinge mechanism for a portable device that addresses at least one of the above-mentioned problems.

SUMMARY

In accordance with one aspect of the present invention, there is provided a hinge mechanism for a portable device, the hinge mechanism comprising: a base having a planar surface; a sliding plate having a planar surface; a revolving member located adjacent to a longitudinal edge of the base, the revolving member being capable of revolving and projecting from the base; a dampener located in the base for restraining movement of the revolving member to retain the revolving member in its revolved and projected position; a first joint for coupling the revolving member to the sliding plate, and a plurality of guides arranged longitudinally and transversely in the sliding plate, wherein in a first mode of operation, the sliding plate is slidable over the base in the longitudinal or transverse directions of the base while the planar surface of the sliding plate faces the planar surface of the base, the plurality of guides facilitates the sliding plate to slide over the respective longitudinal and transverse directions of the base by guiding the first joint to run along the longitudinal and transverse arrangements of the plurality of guides when the sliding plate is slid over the base, wherein in a second mode of operation, the sliding plate is substantially slid over the base to a position in the transverse direction of the base, the sliding plate is pivotable about the longitudinal edge of the base to a configuration such that the planar surface of the sliding plate forms an oblique angle relative to the planar surface of the base, the revolving member being adapted to revolve and project from the base when the sliding plate is pivoted into the configuration.

The plurality of guides may comprise a first rail located adjacent to a longitudinal side of the sliding plate and extending longitudinally in the sliding plate, and a second rail may be located adjacent to a transverse side of the sliding plate and may be extending orthogonally from the first rail.

The hinge mechanism may further comprise a second joint for coupling the sliding plate to the base, the second joint being adapted to be guided by the second rail when the hinge mechanism is sliding between two configurations.

The second rail may terminate with an opening at an edge of the sliding plate. The sliding plate may be substantially slid over the base in the transverse direction of the base when the second joint is slide out of the second rails to the opening, and the opening may be sufficiently wide so that the joint will not obstruct tilting of the sliding plate.

The second joint may be biased to resiliently hold the sliding plate and the base together.

The dampener may comprise one or more abutment members residing in the base. The one or more abutment members may be arranged to resiliently press against a side of the revolving member to restrain its revolving movement when the sliding plate is pivoted into the configuration.

The revolving member may comprise one or more slots, and each abutment member may comprise an abutting head. The abutting head may be adapted for pressing resiliently against the revolving member and for sitting in the one or more slots to stop further revolving movement when the revolving member is substantially revolved.

Each of the one or more slots may be so shaped to block further revolving movement when the revolving member is substantially revolved, and to guide the revolving member to revolve back to a configuration where the sliding plate is not pivoted.

The revolving member may comprise one or more side members for fitting on one or more corresponding guiding portions located in the base to guide the revolving movement of the revolving member when the revolving member revolves and projects from or is pushed back into the base.

The hinge mechanism may further comprise a follower arm comprising an elongated apertured centre and a first end coupled to the joint. The follower arm may be adapted to hoop over a protrusion on the sliding plate such that the protrusion is inserted into the elongated apertured centre. The follower arm may be further adapted to rotate about the joint, and the protrusion of the sliding plate being may be adapted to slide along the elongated apertured centre when the sliding plate slides over the base along the longitudinal or transverse directions of the base.

The joint may be biased to resiliently hold the sliding plate and the revolving member together.

The joint may comprise a cam portion, one or more biasing means, and a teeth portion coupled to the one or more biasing means. The cam portion may be arranged to brush against the teeth portion at the time the sliding plate is sliding along the longitudinal or transverse directions of the base while facing the base. The one or more biasing means may be arranged to urge resilient movement of the sliding plate according to the profiles of the cam portion and the teeth portion.

In accordance with another aspect of the present invention, there is provided a portable device comprising a hinge mechanism, the hinge mechanism comprising: a base; a sliding plate slidable over the base in the longitudinal or transverse directions of the base while the planar surface of the sliding plate faces the planar surface of the base; a revolving member located adjacent to a longitudinal edge of the base, the revolving member being capable of revolving and projecting from the base; a dampener located in the base for restraining movement of the revolving member to retain the revolving member in its revolved and projected position; a first joint for coupling the revolving member to the sliding plate, and a plurality of guides arranged longitudinally and transversely in the sliding plate for facilitating the sliding plate to slide over the respective longitudinal and transverse directions of the base by guiding the first joint to run along the longitudinal and transverse arrangements of the plurality of guides when the sliding plate is being slid, wherein when the sliding plate is substantially slid over the base to a position in the transverse direction of the base, the sliding plate is pivotable about the longitudinal edge of the base to a configuration such that the planar surface of the sliding plate forms an oblique angle relative to the planar surface of the base, the revolving member being adapted to revolve and project from the base when the sliding plate is pivoted into the configuration.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

Figure 1:
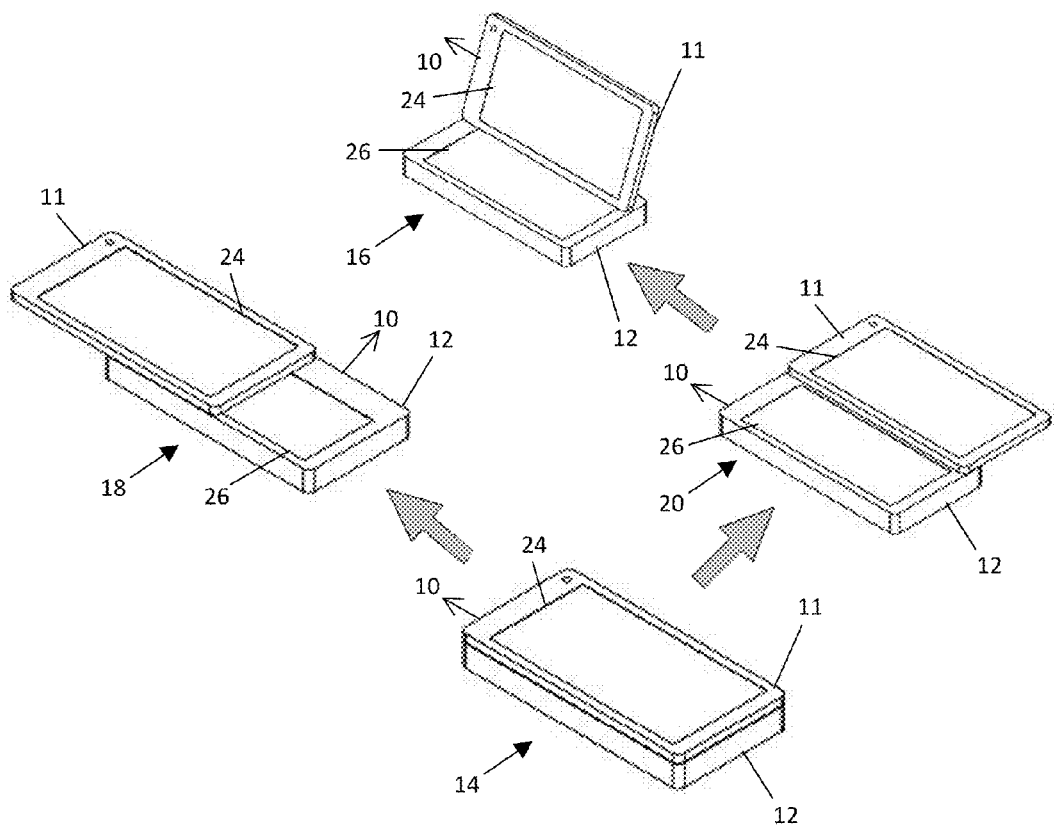
FIG. 1 shows drawings of an example embodiment of the present invention in various configurations.
Figure 2:
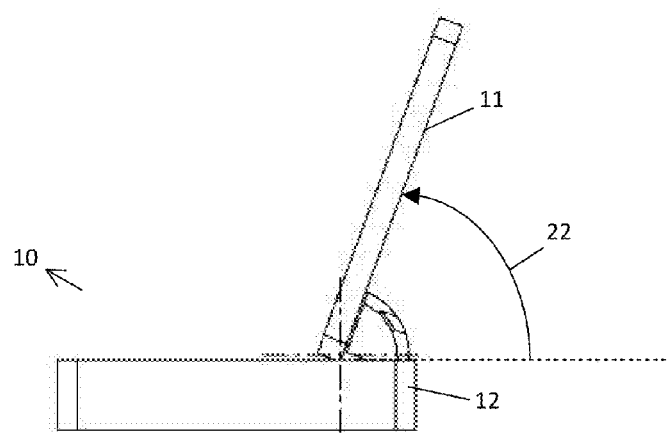
FIG. 2 shows a side view of an example embodiment of the present invention.

FIGS. 1 and 2 show a portable device 10 incorporating an example embodiment of a hinge mechanism (100 in FIG. 3) of the present invention. The portable device 10 has a rectangular top assembly 11 and a rectangular bottom assembly 12. The top assembly 11 and the bottom assembly 12 each contain substantially rectangular displays 24 and 26 respectively. The top assembly 11 is slidable over the bottom assembly 12 along the longitudinal and transverse directions of the bottom assembly 12.

The hinge mechanism (100 in FIG. 3) has two mode of operations and can transform the portable device 10 between four usage configurations, namely, a normal configuration 14 (i.e. non-tilted and non-slid), a tilted landscape configuration 16, a (non-tilted) portrait configuration 18 and a (non-tilted) landscape configuration 20. The first mode of operation of the hinge mechanism (100 in FIG. 3) is the ability to transform the portable device between the normal configuration 14 (i.e. non-tilted and non-slid), the (non-tilted) portrait configuration 18 and the (non-tilted) landscape configuration 20. The second mode of operation of the hinge mechanism (100 in FIG. 3) is the ability to transform the portable device between the (non-tilted) landscape configuration 20 and the tilted landscape configuration 16.

It is appreciated that both the displays 24 and 26 could be Liquid Crystal Displays, Organic Light Emitting Diode, and the like, and could be touch enabled (i.e. employs touchscreen technologies). It is also appreciated that the area containing the display 26 on the bottom assembly 12 could contain a numerical key pad, device operational buttons, and/or a Qwerty key pad instead of a display.

In the normal configuration 14, the top assembly 11 is lying entirely on the bottom assembly 12.

In the tilted landscape configuration 16, the top assembly 11 is substantially slid transversely across the bottom assembly 12 and tilted relative to the bottom assembly 12. The planar surface of the top assembly 11 is pivoted relative to the bottom assembly 12 and tilted or pivoted at an angle 22 away from the planar surface of the bottom assembly 12. The tilting or pivoting angle 22 may be in the range of 0 to 90 degrees. For ergonomic viewing of the display 24 on the top assembly 11 when the bottom assembly 12 is placed on a flat surface, the angle 22 may be tilted to between 60 to 80 degrees.

In the portrait configuration 18, the top assembly 11 is slid longitudinally across the bottom assembly 12.

In the (non-tilted) landscape configuration 20, the top assembly 11 is slid transversely across the bottom assembly 12. The angle 22 is 0 degrees in this case.

Figure 3:
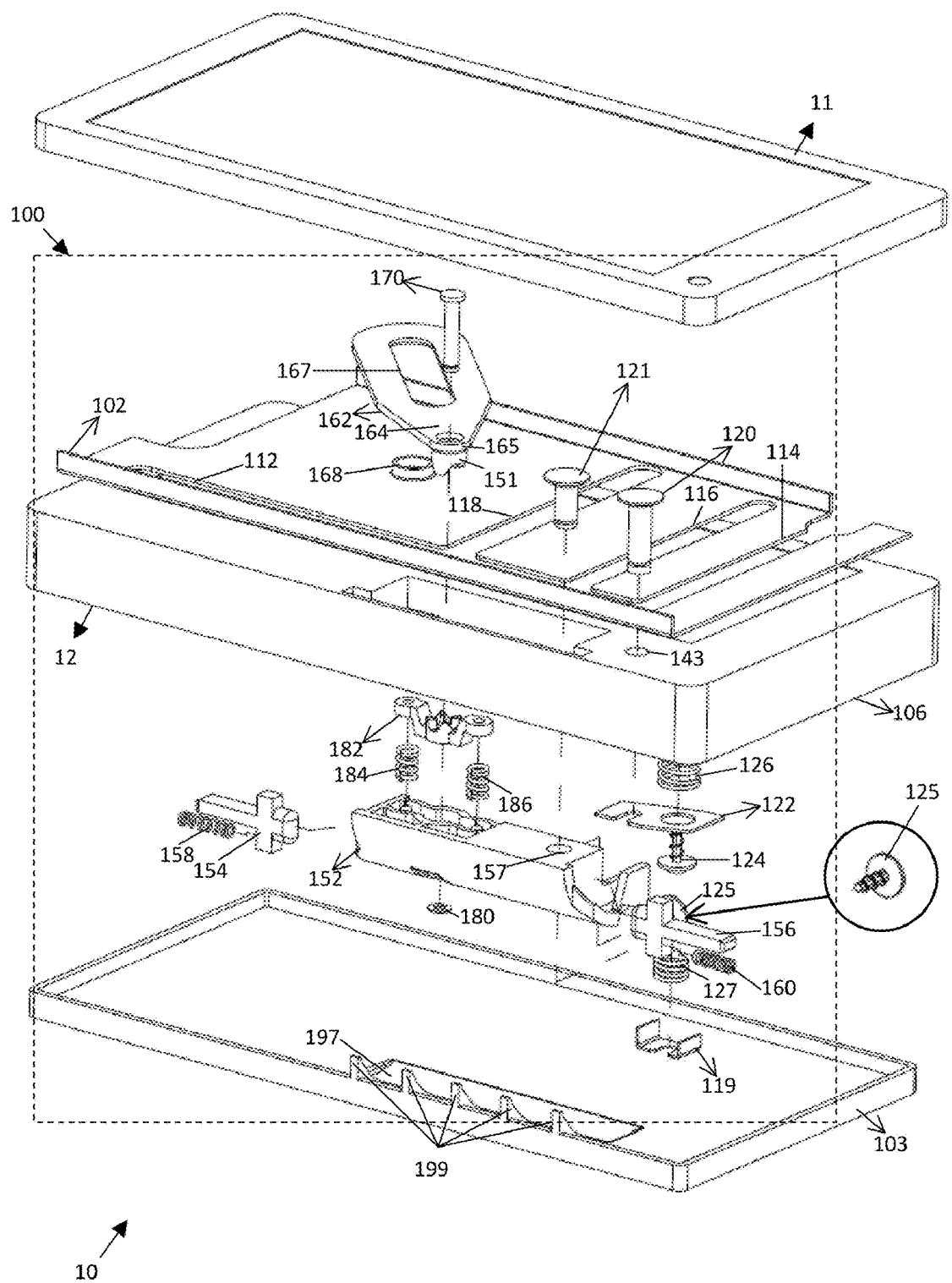
FIG. 3 shows an exploded view of an example embodiment of the present invention.

FIG. 3 shows an exploded view of the portable device 10, and the hinge mechanism 100 for enabling the aforementioned first and second modes of operation. Electronic components of the portable device 10 are deliberately removed in FIG. 3 for clearer illustration of the mechanical parts of the hinge mechanism 100. It is appreciated that a person skilled in the art would be able to perceive the design for the electronic components based on the mechanical design of the hinge mechanism 100. Hence, the electronic components would not be described herein.

The hinge mechanism 100 includes a generally rectangular sliding plate 102, arranged to couple to the base 106. The rectangular sliding plate 102 is capable of sliding longitudinally and transversely over the base 106. Longitudinal directions refer to directions along the major length of the base 106 and transverse directions refer to directions along the width of the base 106.

The sliding plate 102 is mounted in the top assembly 11 of the portable device 10 and the base 106 is part of the bottom assembly 12 of the portable device 10. There is provided a bottom assembly cover 103 attachable to the base 106 to cover the un-exposed electronic components and hinge mechanism parts of the portable device 10.

A revolving member 152 having a generally quarter-cylindrical shape is coupled to the sliding plate 102 and mounted to the base 106. The revolving member 152 is adapted to revolve and project from the base when the sliding plate 102 is tilting relative to the base 106 in the tilted landscape configuration (16 in FIGS. 1 and 2).

The sliding plate 102 has a first rail 112 and a second rail 114 (i.e. guides) for guiding the sliding plate 102 to slide longitudinally and transversely over the base 106. The first rail 112 extends longitudinally in the sliding plate 102 and is located close to a longer rectangular side of the sliding plate 102. The second rail 114 extends orthogonally from the first rail 112 and is located close to a shorter rectangular side of the sliding plate 102. Some coupling components joining the sliding plate 102 to the base 106 are configured to run along the first 112 and second rail 114.

The sliding plate 102 further includes a third rail 116 and a fourth rail 118 (i.e. guides), which are both parallel to the second rail 114 and extending orthogonally from the first rail 112. The third rail 116 and fourth rail 118 act as guiding means for transverse movements of the sliding plate 102. Some coupling components joining the sliding plate 102 to the revolving member 152 are configured to run along the third rail 116 and fourth rail 118.

The sliding plate 102 is resiliently secured to the base 106 through coupling components including a first coupling pin 120, a first lock plate 122, a first flanged head screw 124 and a vertically disposed first helical spring 126. These components are assembled together to form a first joint that is used for holding the sliding plate 102 and base 106 together during the normal configuration (14 in FIG. 1) and the portrait configuration (18 in FIG. 1). The base 106 has a first mounting hole 143 for receiving the first coupling pin 120 to secure the sliding plate 102 to the base 106.

The sliding plate 102 is resiliently secured to the revolving member 152 through coupling components including a second coupling pin 121, a second lock plate 119, a second flanged head screw 125 and a vertically disposed second helical spring 127. These components are assembled together to form a second joint that is used for holding the sliding plate 102 and revolving member 152 together during all the configurations (14, 16, 18 and 20 in FIG. 1). As the second flanged head screw 125 is obstructed, a separate figure is drawn in FIG. 3 to show it clearly. The revolving member 152 has a second mounting hole 157 for receiving the second coupling pin 121 to secure the sliding plate 102 to the revolving member 152.

A third coupling pin 170, a locking circlip 180, a winged teeth member 182, two vertically disposed third and fourth helical springs 184 and 186 respectively and a follower arm 162 are used to provide resilience to the longitudinal and transverse movements of the sliding plate 102 and to further secure the sliding plate 102 to the revolving member 152. These components are assembled together to form a third joint that is used for holding the sliding plate 102 and revolving member 152 together during all the configurations (14, 16, 18 and 20 in FIG. 1).

Two abutment members 154 and 156 and two horizontally disposed fifth and sixth helical springs 158 and 160 work in cooperation as a dampener to restrain the movements of the revolving member 152 so as to retain the revolving member in its revolved and projected position.

In the example embodiment, the follower arm 162 is a generally elliptical, oval or oblong flat metal piece. The follower arm 162 has an inner and similarly elliptical, oval or oblong shaped aperture 167 (i.e. having an elongated apertured centre) sharing the same axes as the generally elliptical, oval or oblong shape of the follower arm 162. In the assembled portable device 10, the follower arm 162 is hooped over a substantially centrally located protrusion 168 on the sliding plate 102 with the protrusion 168 inserted through aperture 167. One end (hereinafter "tapered end") 164 of the follower arm 162 tapers away from the follower arm 162 into a rounded edge 165. There is a circular circumferential extension 151 extending perpendicularly downwards from the planar surface of the follower arm 162 adjacent to the rounded edge 165. The circular circumferential extension 151 is generally tubular and terminates with an end having two cam edges (406 in FIG. 10). The third coupling pin 170 is inserted through the bore of the circular circumferential extension 151 to couple the follower arm 162 to the sliding plate 102. The follower arm 162 could be pivoted about the third joint (i.e. the joint that includes the third coupling pin 170). When the sliding plate 102 is slid longitudinally or transversely with respect to the base 106, the central protrusion 168 on the sliding plate 102 pushes the follower arm 162 into rotation about the third joint as it slides along the longer length of the elliptical, oval or oblong aperture 167.

Support structures in the form of a plurality of support stands 199 and a recessed seat 197 are located on the bottom assembly cover 103 for supporting and guiding the revolving movements of the revolving member 152. In the assembled portable device 10, the revolving member 152 rests in the recessed seat 197. The recessed seat 197 is shaped to match the sides of the revolving member 152. The plurality of support stands 199 are so shaped to support and guide revolving movements of the revolving member 152.

Figure 4:
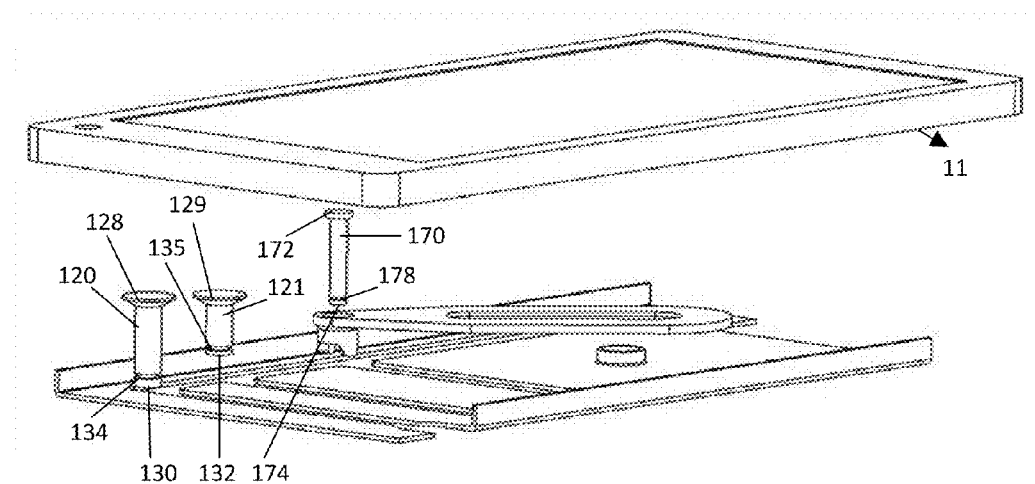
FIG. 4 shows an exploded view of an example embodiment of the present invention.

FIG. 4 shows an exploded perspective view of the top assembly 11. The purpose of this figure is to illustrate the first coupling pin 120, second coupling pin 121 and the third coupling pin 170. The first coupling pin 120, second coupling pin 121 and the third coupling pin 170 as shown are generally cylindrical in shape, each having a flanged head 128, 129 and 172 respectively with projecting rims, and ring grooves 134, 135 and 178 respectively located close to the respective tail ends 130, 132 and 174 (opposite to the flanged head 128, 129 and 172 respectively) of their cylindrical body.

Figure 5:
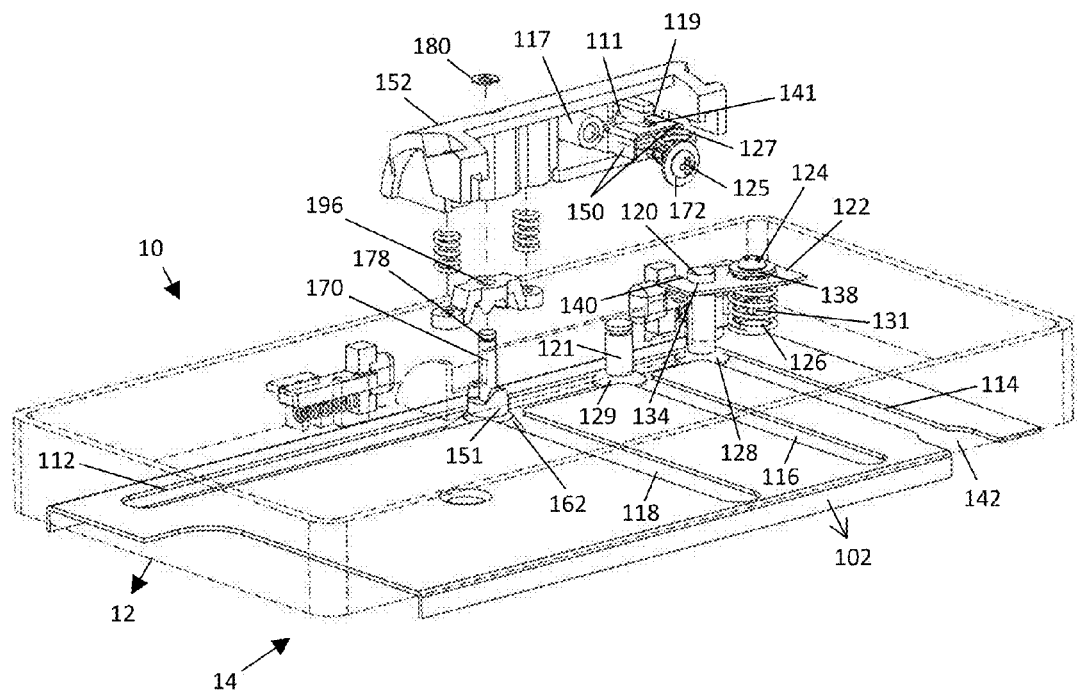
FIG. 5 shows a partially exploded view of an example embodiment of the present invention.

FIG. 5 shows a partly exploded and see-through rear perspective view of the portable device 10 in normal configuration 14.

The first coupling pin 120 is inserted through, in respective order, the intersection of the first rail 112 and the second rail 114, and a first mounting hole (143 in FIG. 3) residing on the base 106. The first coupling pin 120 is adapted to run along the first rail 112 in the longitudinal directions of the base 106 when the top assembly 11 is slid over the bottom assembly 12 during the transition of the portable device 10 from the normal configuration 14 to the portrait configuration (18 in FIG. 1). The first coupling pin 120 is adapted to run along the second rail 114 in the transverse directions of the base 106 when the top assembly 11 is slid over the bottom assembly 12 during the transition of the portable device 10 from the normal configuration 14 to the FIG. 1 (non-tilted) landscape configuration (20 in FIG. 1). The first lock plate 122 is generally rectangular in shape with a side slot 140 in one half and a circular hole 138 in the other half. The side slot 140 is slotted into the ring groove 134 of the first coupling pin 120 to lock the first coupling pin 120 in its position. The first flanged head screw 124 is inserted through the circular hole 138 of the first lock plate 122 and the core of the vertically disposed first helical spring 126 and screwed to a threaded tubular protrusion (also known as a boss) 131 on the base 106 to hold the first lock plate 122 in position. The first helical spring 126 provides biasing forces to hold the flanged head 128 of the first coupling pin 120 resiliently against the sliding plate 102. The first helical spring 126 also functions as resilient means to minimise scratching at the contacts and rigidity in sliding movement when the sliding plate 102 slides over the base 106.

FIG. 5 further shows that the second rail 114 terminates with an opening 142 at a side of the sliding plate 102. The sliding plate 102, which is part of the top assembly 11, is considered substantially slid over the base 106 in the transverse direction of the base 106 when the first coupling pin 120 is slid out of the second rail 114 into the opening 142. The opening 142 is sufficiently wide so that the flanged head 128 of the first coupling pin 120 will not obstruct the tilting of the sliding plate 102.

The second coupling pin 121 is adapted to run along the first rail 112 in the longitudinal directions of the base 106 when the portable device 10 is changing from the normal configuration 14 to the portrait configuration (18 in FIG. 1). The second coupling pin 121 is also adapted to run along the third rail 116 in the transverse directions of the base 106 when the portable device 10 is changing from the normal configuration 14 to FIG. 1 the (non-tilted) landscape configuration (20 in FIG. 1). When the assembled portable device 10 is in the normal configuration 14, the second coupling pin 121 is inserted through the intersection of the first rail 112 and the third rail 116, a second mounting hole (157 in FIG. 3) in the revolving member 152 and the core of the vertically disposed second helical spring 127.

The second coupling pin 121 is secured in its position by the second flanged screw 125 and the second lock plate 119. The second lock plate 119 is generally a metal strip with a centrally disposed side groove 141 and two folded edges 150 located on opposite sides of the centrally disposed side groove 141. In the assembled portable device 10, the centrally disposed side groove 141 is slotted in the tail end 132 of the second coupling pin 121 to secure the second coupling pin 121. The second flanged screw 125 is fastened to a tubular projection (also known as a boss) 117 with inner threading projecting from the revolving member 152. The second flanged screw 125 is sufficiently fastened when the flanged head 172 of the second flanged screw 125 is tightened against the thin side edges of the second lock plate 119 to block the second lock plate 119 from moving out of its allocated seat 111 in the revolving member 152. The second helical spring 127 is received between the folded edges 150 of the second lock plate 119. The folded edges 150 serve as boundaries to block sideward movements of the second helical spring 127. The second helical spring 127 provides biasing forces to press the flanged head 129 of the second coupling pin 121 resiliently against the sliding plate 102. The second helical spring 127 also functions as resilient means to minimise scratching at the contacts and to minimise rigidity in sliding movement when the sliding plate 102 slides over the base 106.

The circular circumferential extension 151 of the follower arm 162 with the third coupling pin 170 inserted through its bore is adapted to slide along the first rail 112 in the longitudinal directions of the base 106 or along the fourth rail 118 in the transverse directions of the base 106 when the portable device 10 is changing from the normal configuration 14 to the portrait configuration 18 or the (non-tilted) landscape configuration 20 respectively. The third coupling pin 170 is fixed to the revolving member 152 by a locking circlip 180 adapted to slot in the third ring groove 178.

Figure 6:
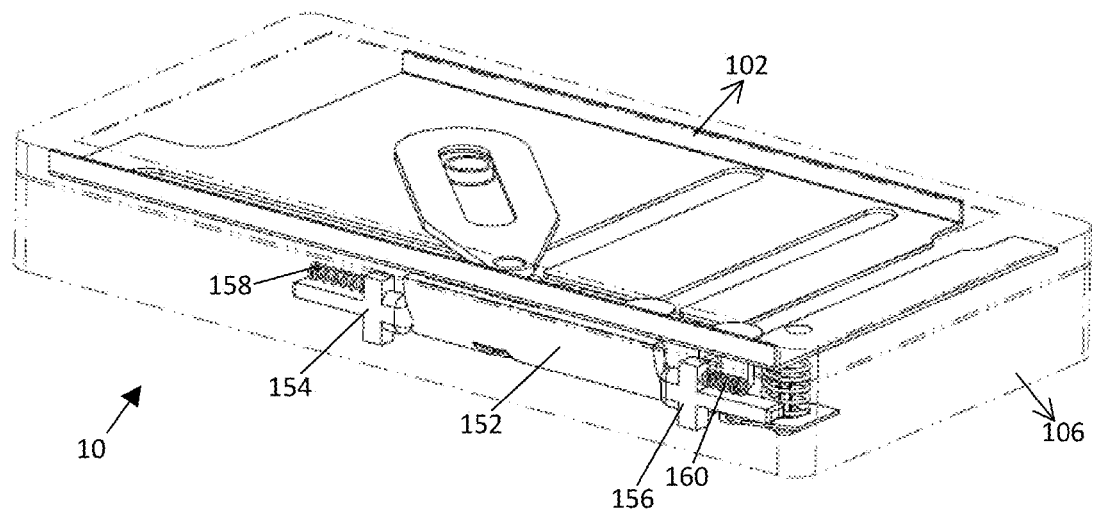
FIG. 6 shows an assembled view of an example embodiment of the present invention.

FIG. 6 shows the portable device 10 described with reference to FIG. 3 in assembled form with the top assembly 11 and the base 106 represented in see-through format.

The hinge mechanism 100 includes various resilient means for urging resilient movement of the sliding plate 102 into the various usage configurations of the portable device 10. One of the resilient means include the two abutment members 154 and 156 and the two horizontally disposed fifth and sixth helical springs 158 and 160, which are located in the base 106 when assembled. The abutment members 154, 156 are arranged to abut against the revolving member 152 and to restrain its revolving movement when the sliding plate 102 is tilted. The abutment members 154, 156 are used to lock the revolving member 152 when the sliding plate 102 is fully tilted to prevent further movement of the revolving member 152. The fifth and sixth helical springs 158 and 160 provide biasing forces to resiliently push the abutment members 154, 156 against the revolving member 152 to restrain its rotation when the sliding plate 102 rotates from the (non-tilted) landscape configuration 20 to the tilted landscape configuration 16.

Figure 7:
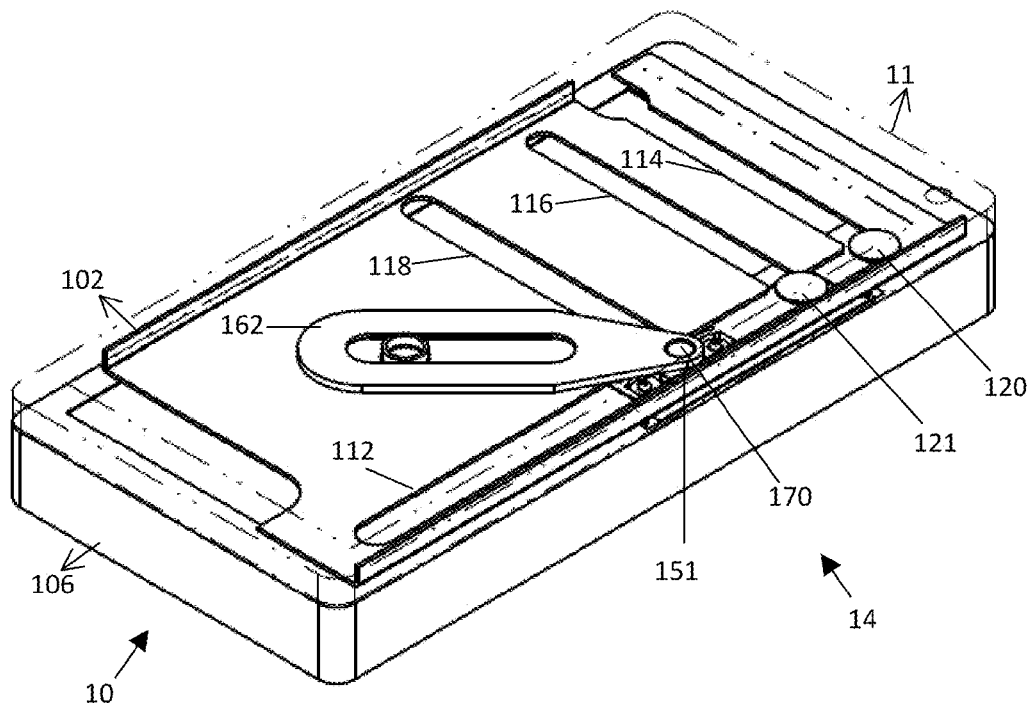
FIG. 7 shows a schematic drawing of an example embodiment of the present invention in a particular configuration.

FIG. 7 shows the portable device 10 described above with reference to FIGS. 1 to 6 in assembled form and in the normal configuration 14. The top assembly 11 of portable device 10 is shown in see-through format. The first coupling pin 120, the second coupling pin 121 and the third coupling pin 170 (together with the circular circumferential extension 151 of the follower arm 162) are located at the intersections of the first and second rails 112, 114, the first and third rails 112, 116 and the first and fourth rails 112, 118, respectively. In the present configuration 14, the top assembly 11 of the portable device 10 where the sliding plate 102 is mounted entirely covers the top surface of the base 106.

Figure 8:
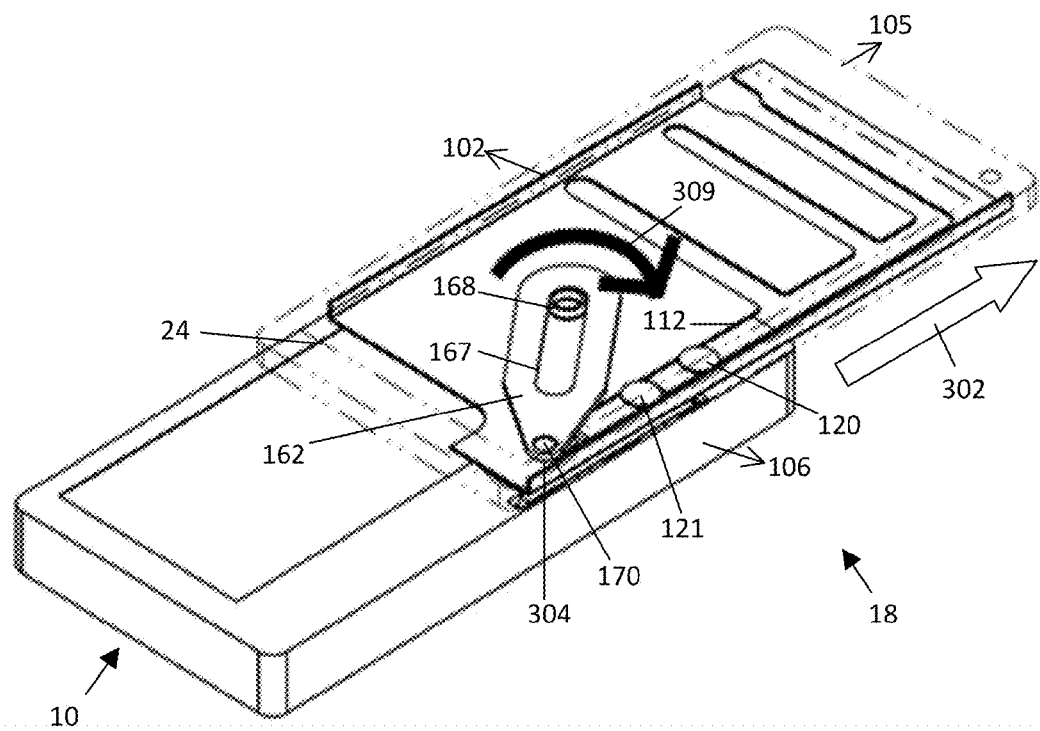
FIG. 8 shows a schematic drawing of an example embodiment of the present invention in a particular configuration.

FIG. 8 shows the portable device 10 described above with reference to FIGS. 1 to 6 in assembled form and in the portrait configuration 18. The top assembly 11 of portable device 10 is shown in see-through format. In this configuration, the contents in the display 24 (translucent in FIG. 8) on the top assembly 11 would be displayed in portrait format unless it is configured to be otherwise. To arrive at the present configuration 18, the sliding plate 102 is slid upwards along a longitudinal direction 302 of the base 106 from the normal configuration 14. The first coupling pin 120, second coupling pin 121 and the edge including the third coupling pin 170 and the circular circumferential extension 151 of the follower arm 162 run along the first rail 112 when the sliding plate 102 is sliding. The sliding plate 102 stops sliding when the edge including the third coupling pin 170 and the circular circumferential extension 151 of the follower arm 162 abuts a terminating end 304 of the first rail 112 and the central protrusion 168 on the sliding plate 102 abuts against an edge of the aperture 167 of the follower arm 162 furthest away from the circular circumferential extension 151. The follower arm 162 pivots about the third joint (the one including the third coupling pin 170) and rotates in an anticlockwise direction 309 when the sliding plate 102 is slid in the longitudinal direction 302.

Figure 9:
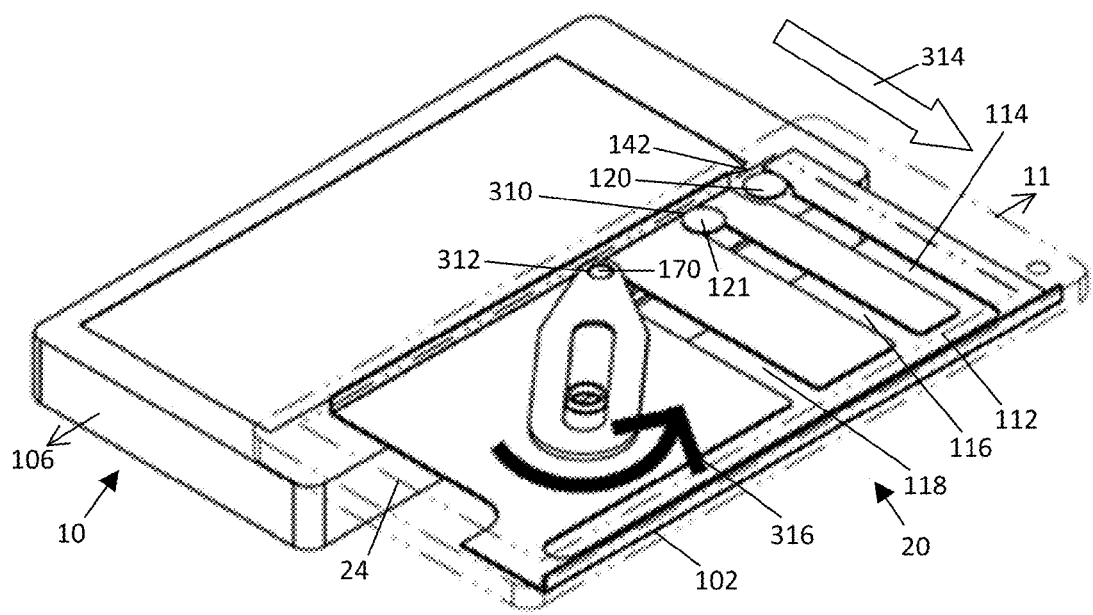
FIG. 9 shows a schematic drawing of an example embodiment of the present invention in a particular configuration.

FIG. 9 shows the portable device 10 described above with reference to FIGS. 1 to 6 in assembled form and in the (non-tilted) landscape configuration 20. The top assembly 11 of portable device 10 is shown in see-through format. In this configuration, the contents in the display 24 (translucent in FIG. 8) are displayed in landscape format unless it is configured to be otherwise. To arrive at the present configuration 20, the sliding plate 102 is slid rightwards along a transverse direction 314 of the base 106 from the normal configuration 14. The first, second and third couplings 120, 121, 170 run along the second, third and fourth rails 112, 114, 116 as the sliding plate 102 is sliding. The sliding plate 102 stops sliding when the second and third coupling pins 121, 170 abut terminating ends 310, 312 of the third and fourth rails 116, 118, respectively. At this point, the first coupling pin 120 has moved to the opening 142. The lengths of the third and fourth rails 116, 118 determine the extent in which the sliding plate 102 can slide in the transverse direction 314 of the base 106. The follower arm 162 pivots about the third joint (the one including the third coupling pin 170) and rotates in a clockwise direction 316 when the sliding plate 102 is slid in the transverse direction 314.

Figure 10:
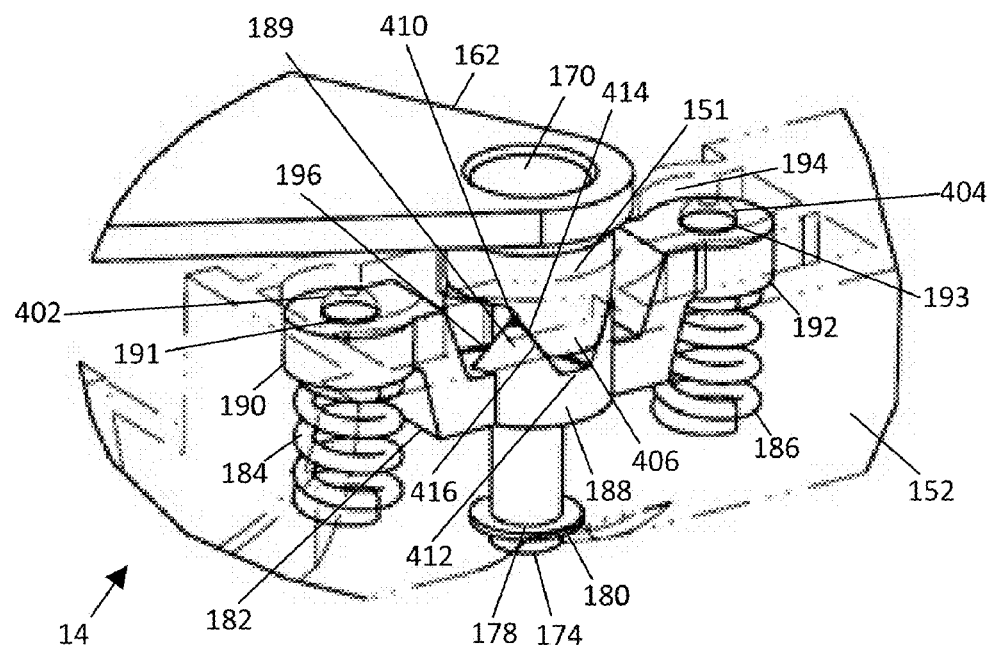
FIG. 10 shows a schematic drawing of a specific part of an example embodiment of the present invention.

FIG. 10 shows a close up view of the components interconnecting the circular circumferential extension 151 of the follower arm 162, the winged teeth member 182, and the revolving member 152 described earlier with reference to FIG. 3. The revolving member 152 is represented in see-through format. The configuration of the portable device 10 shown in FIG. 10 is the normal configuration 14.

The winged teeth member 182 has two extensions (i.e. wings) 190, 192 extending from opposing sides of a central teeth portion 188. The central teeth portion 188 has four symmetrically positioned teeth 189 located thereon. The ends of the wings 190, 192 are ring shaped with centre throughholes 191, 193 respectively for mounting screws 402 and 404 to insert through. The winged teeth member 182 is arranged to sit in a slot 194 in the revolving member 152. The winged teeth member 182 has a central hole 196 (For clearer picture of the central hole 196, see FIG. 5) between the two extensions 190, 192.

The third coupling pin 170 is inserted through the bore of the circular circumferential extension 151 of the follower arm 162, the central hole 196 of the winged teeth member 182 and a hole (transparent in FIG. 10, 506 in FIG. 11) in the revolving member 152. The locking circlip 180 is slipped in the third ring groove 178 at the third tail end 174 of the third coupling pin 170 to lock the third coupling pin 170 in its position. Alignment shafts 402, 404 extending from the base 106 are inserted through the ring holes 191, 193 on the wings 190, 192 and through the hollow core of the third and fourth helical springs 184, 186 respectively to prevent lateral movements of the wings 190, 192 and the third and fourth helical springs 184, 186.

The two cam edges 406 (only 1 cam is visible in FIG. 10) of the circular circumferential extension 151 of the follower arm 162 are arranged to engaged notches formed between the teeth of the four teeth 189 on the winged teeth member 182 when the portable device 10 is in the normal configuration 14. In the example embodiment, each of the cam edges 406 is generally shaped as a symmetrical trapezium, which has two inclined walls 414 (hereinafter "tapered sides") tapering into a flat horizontal surface 412. Each tooth of the four teeth 189 is triangular in shape and has two inclined walls 416 (i.e. notch walls) tapering into a pointed end 410. The two inclined side walls 416 of each tooth are parallel to the tapered sides 414 of each of the two cam edges 406.

The cam edges 406 brush against the walls of the notches between the four teeth 189 when the sliding plate 102 is sliding along the longitudinal or transverse directions over the base 106. The two vertically disposed third and fourth helical springs 184, 186 are positioned beneath the wings 190, 192 respectively to provide biasing forces to resist or speed up the sliding movements of the sliding plate 102 when the cam edges 406 brush against the notches between the four teeth 189 under the rotation of the follower arm 162. The biasing forces exerted on the sliding plate 102 are dependent on the shape profiles of the cam edges 406 and the four teeth 189.

When the sliding plate 102 is slid and the follower arm 162 is rotated clockwise to change the portable device 10 from the normal configuration 14 to the portrait configuration 18 or from the portrait configuration 18 back to the normal configuration 14, the tapered sides 414 (only 1 cam is visible in FIG. 10) of the cam edges 406 in contact with the inclined side walls 416 of the four teeth 189 push the inclined side walls 416 of the notches between the four teeth 189 against biasing forces exerted on the wings 190, 192 by the third and fourth helical springs 184, 186. As the clockwise rotation continues, the tapered sides 414 of the cam edges 406 continue to push the inclined side walls 416 of the four teeth 189 until pointed ends 410 of each tooth of the four teeth 189 meet the flat horizontal surfaces 412 of the cam edges 406. There is resistance to the rotation prior to the pointed ends 410 meeting the flat horizontal surface 412.

As rotation continues further and the cam edges 406 are pushed over the length of the flat horizontal surfaces 412, the pointed tips 410 of the four teeth 189 slides over the respective flat horizontal surfaces 412 of the cam edges 406. There is little resistance to the rotation when the pointed tips 410 are sliding over the flat horizontal surfaces 412.

When the pointed tips 410 of the four teeth 189 are slid beyond the length of the flat horizontal surfaces 412, the inclined side walls 416 of the four teeth 189 make contact with the tapered sides 414 of the cam edges 406 again. At this instance, the pushing direction is reversed, that is, the inclined side walls 416 of the four teeth now pushes on the cam edges under pressure from the biasing forces exerted on the wings 190, 192 by the third and fourth helical springs 184, 186. The reversal in pushing direction is caused by the reversal in sloping direction of the tapered sides 414 of the cam edges 406 and the inclined side walls 416 of the four teeth 189. As a result of the reversal in pushing direction, movement into the portrait configuration 18 is expedited.

The aforementioned description relating to clockwise movement of the follower arm 162 could be similarly applied in the reverse scenario for the case where the rotation of the follower arm 162 is anticlockwise to get from the normal configuration 14 to the (non-tilted) landscape configuration 20 or from the portrait configuration 18 back to the normal configuration 14.

Figure 11:
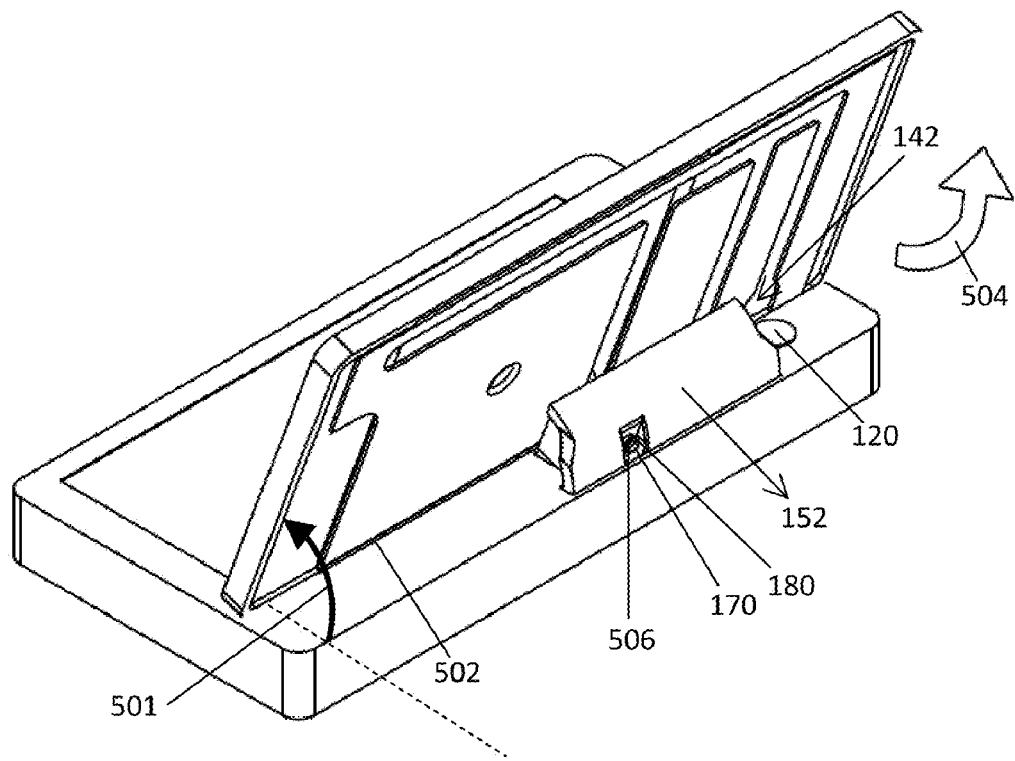
FIG. 11 shows a schematic drawing of an example embodiment of the present invention in a particular configuration.

FIG. 11 shows a tilted landscape configuration 16 of the portable device 10 as described with reference to FIGS. 1 to 9. To arrive at this configuration, firstly, the sliding plate 102 is slid into the (non-tilted) landscape configuration 20 as described with reference to FIG. 9. Thereafter, the sliding plate 102 is pivoted about the contact edge 502 (i.e. about the longitudinal edge of the base 106 between the sliding plate 102 and the base 106) and tilted upwards in an anticlockwise direction 504 as shown in FIG. 11. The revolving member 152 couples the sliding plate 102 and base 106 together. As the sliding plate 102 is pivoted, the revolving member 152 revolves and projects out of the base 106. The revolving member 152 could be revolved until an angle 501 (the same as the angle 22 in FIG. 2) of e.g. 70 degrees between the plane of the sliding plate 102 and the plane of the base 106. In the example embodiment, the sliding plate 102 is capable of pivoting or tilting until it is almost perpendicular to the planar surface of the base 106.

In addition, FIG. 11 illustrates more clearly the hole 506 in the revolving member 152, which the third coupling pin 170 is inserted through and secured by the locking circlip 180.

Figure 12:
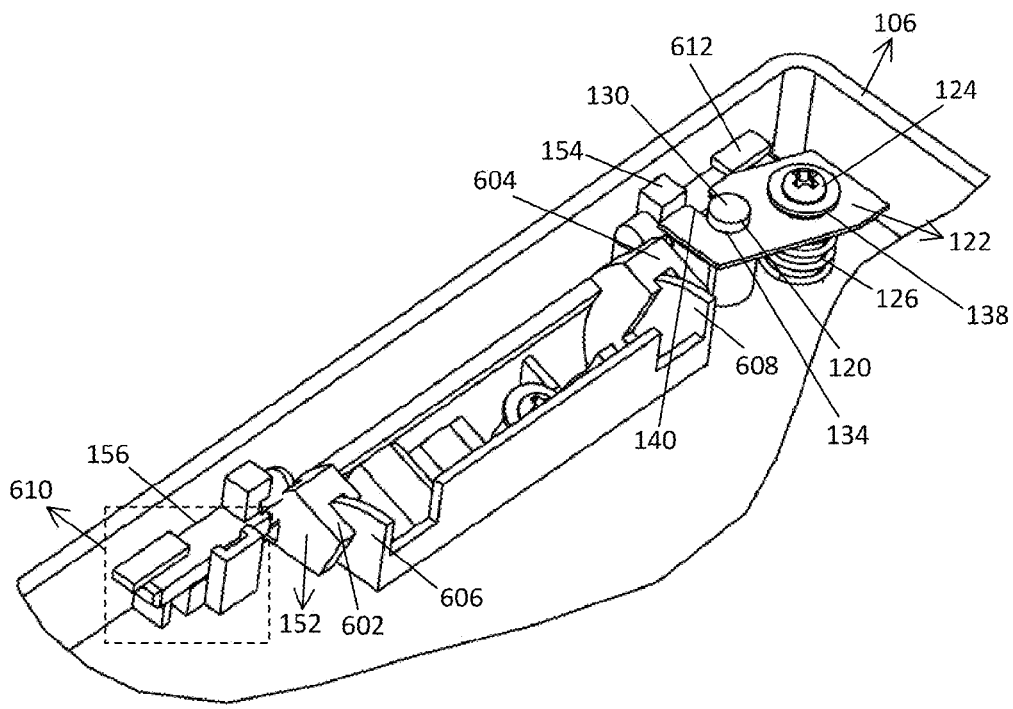
FIG. 12 shows a schematic drawing of a specific part of an example embodiment of the present invention.

FIG. 12 shows the arrangement of the revolving member 152, described previously with reference to earlier figures, on the underside of the base 106 when the sliding plate 102 has been fully tilted. The revolving member 152 includes two side members 602, 604, adapted to fit on two corresponding guiding portions 606, 608. The two side members 602, 604 are located in the base 106 to guide the revolving movement of the revolving member 152 when the revolving member 152 is revolving and projecting from or is being pushed back into the base 106. The abutment members 154, 156 are slotted into respective fixtures 612, 610 residing on the underside of the base 106. The abutment members 154, 156 lock both side members 602, 604 respectively and prevent the revolving member 152 from further rotation and projection out of the base 106.

Figure 13:
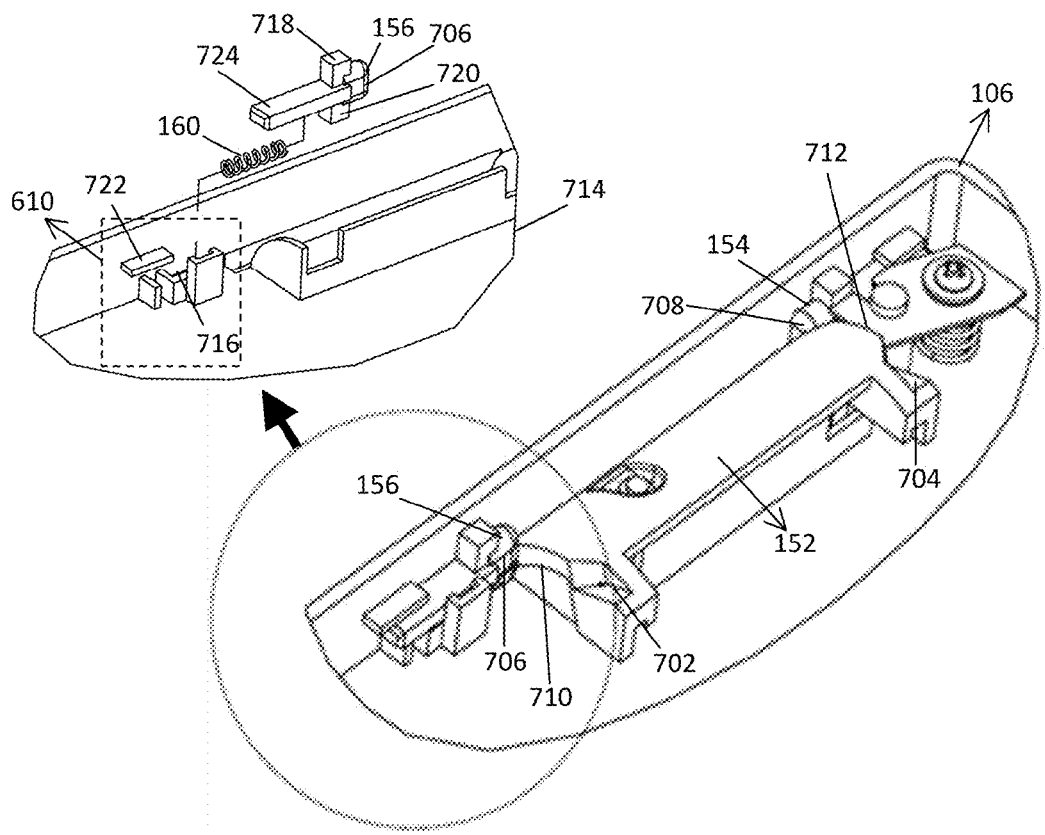
FIG. 13 shows a schematic drawing of a specific part of an example embodiment of the present invention.

FIG. 13 shows the arrangement of the revolving member 152, described previously with reference to earlier figures, on the underside of the base 106 when the revolving member 152 has been fully revolved into the base 106. Each of the abutment members 154, 156 has an abutting head 706, 708 respectively. The abutting heads 706, 708 are biased by the fifth and sixth helical springs 158, 160 to press against smooth side surfaces 710, 712 on the revolving member 152 throughout the revolving movement of the revolving member 152 to restrain the revolving movement.

The revolving member 152 further includes two locking slots 702, 704. The abutting heads 706, 708 are adapted to slip and lock into the locking slots 702, 704 to prevent further revolving movement when the revolving member 152 is substantially revolved. In the example embodiment, the locking slots 702, 704 are recessed areas designed to receive the respective abutting heads 706, 708 and block the revolving member 152 from further revolving movement when the revolving member 152 has been fully revolved. The locking slots 702, 704 and the abutting heads 706, 708 are shaped such that the abutting heads 706, 708 can conveniently slip back into contact with the smooth side surfaces 710, 712 on the revolving member 152 when the revolving member 152 is revolved back to the (non-tilted) landscape configuration 20.

A separate drawing 714 zooming in on the fixture 610 described with reference to FIG. 12 is shown in FIG. 13. The fixture 610 has a abutment member slot 722 to receive the abutment member 156 and a spring slot 716 for housing the sixth helical spring 160 horizontally. The abutment member 156 has two extensions 718, 720 extending perpendicularly and in opposite directions away from the horizontally disposed abutment member 156 at the location behind the abutting head 706. The abutment member 156 may be assembled in the abutment member slot 722 with either extension 718 or 720 pointing downwards. The sixth helical spring 160 is placed in contact with the extension 718 or 720 of the abutment member 156 to exert biasing forces on the abutment member 156 for restraining the revolving movement of the revolving member 152. Fixture 612 and abutment member 154 are designed in the same manner as fixture 610 and abutment member 156.

Generally, example embodiments of the present invention may be in the form of a hinge mechanism (e.g. 100 in FIG. 3) for a portable device. The hinge mechanism (e.g. 100 in FIG. 3) has a base (e.g. 106 in FIG. 3) having a planar surface, a sliding plate (e.g. 102 in FIG. 3) having a planar surface, and a revolving member (e.g. 152 in FIG. 3) located adjacent to a longitudinal edge of the base (e.g. 106 in FIG. 3). The revolving member (e.g. 152 in FIG. 3) is capable of revolving and projecting from the base (e.g. 106 in FIG. 3). The hinge mechanism (e.g. 100 in FIG. 3) further includes a dampener (e.g. 154, 156 in FIG. 3 and the accompanying components enabling their functions) located in the base for restraining movement of the revolving member (e.g. 152 in FIG. 3) to retain the revolving member (e.g. 152 in FIG. 3) in its revolved and projected position. The hinge mechanism (e.g. 100 in FIG. 3) also includes a first joint (e.g. the second joint and/or the third joint described later with reference to FIG. 3) for coupling the revolving member (e.g. 152 in FIG. 3) to the sliding plate (e.g. 102 in FIG. 3). Furthermore, the hinge mechanism (e.g. 100 in FIG. 3) includes a plurality of guides (e.g. 112, 114, 116, 118 in FIG. 3) arranged longitudinally and transversely in the sliding plate (e.g. 102 in FIG. 3). In a first mode of operation of the hinge mechanism (e.g. 100 in FIG. 3), the sliding plate (e.g. 102 in FIG. 3) is slidable over the base (e.g. 106 in FIG. 3) in the longitudinal or transverse directions of the base (e.g. 106 in FIG. 3) while the planar surface of the sliding plate (e.g. 102 in FIG. 3) faces the planar surface of the base (e.g. 106 in FIG. 3), the plurality of guides (e.g. 112, 114, 116, 118 in FIG. 3) facilitates the sliding plate (e.g. 102 in FIG. 3) to slide over the respective longitudinal and transverse directions of the base (e.g. 106 in FIG. 3) by guiding the first joint (e.g. the second joint and/or the third joint described later with reference to FIG. 3) to run along the longitudinal and transverse arrangements of the plurality of guides (e.g. 112, 114, 116, 118 in FIG. 3) when the sliding plate (e.g. 102 in FIG. 3) is being slid over the base (e.g. 106 in FIG. 3). In a second mode of operation of the hinge mechanism (e.g. 100 in FIG. 3), the sliding plate (e.g. 102 in FIG. 3) is substantially slid over the base (e.g. 106 in FIG. 3) to a position in the transverse direction of the base (e.g. 102 in FIG. 3), the sliding plate (e.g. 102 in FIG. 3) is pivotable about the longitudinal edge of the base (e.g. 106 in FIG. 3) to a configuration such that the planar surface of the sliding plate (e.g. 102 in FIG. 3) forms an oblique angle (e.g. angle 22 in FIG. 2) relative to the planar surface of the base (e.g. 106 in FIG. 3). The revolving member (e.g. 152 in FIG. 3) is adapted to revolve and project from the base (e.g. 106 in FIG. 3) when the sliding plate (e.g. 102 in FIG. 3) is pivoted into the configuration.

Advantages of the example embodiments of the present invention may include the following.

Compared to candy bar phone designs, the portable device 10 described with reference to all the figures require no external supporting means to angle the display 24 for hands free viewing. The base 106, revolving member 152 and the accompanying parts advantageously provide the necessary support to angle the portable device 10 for hands free screen viewing.

Compared to slider phone designs, the hinge mechanism 100 of the portable device 10 described with reference to all the figures advantageously provides the necessary support to tilt the portable device 10 into the tilted landscape configuration 16 for hands free screen viewing. Most slider phone designs cannot be tilted into a configuration such as the tilted landscape configuration 16.

Compared to flip phone designs, the non-tilted and tilted landscape configurations 20 and 16 respectively of the portable device 10 described with reference to all the figures are better for, e.g. browsing the Internet. Moreover, the main display, i.e. display 24, is located on the front side of the portable device 10 for viewing and the user need not flip the portable device 10 open to view the main display.

Compared to swivel phone designs, advantageously, the portable device 10 described with reference to all the figures does not require large rotational motions to swivel like swivel phones. Also, the ability of the portable device 10 to slide and tilt is believed to be more direct and intuitive.

It is appreciated that the portable device 10 described with reference to the figures and discussed herein may be a mobile phone, laptop computer, ultra mobile personal computer, personal digital assistant, entertainment device (e.g. gaming device and/or media player), and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A hinge mechanism for a portable device, the hinge mechanism comprising:
    a base having a planar surface;
    a sliding plate having a planar surface;
    a revolving member located adjacent to a longitudinal edge of the base, the revolving member being capable of revolving and projecting from the base;
    a dampener located in the base for restraining movement of the revolving member to retain the revolving member in its revolved and projected position;
    a first joint for coupling the revolving member to the sliding plate, and
    a plurality of guides arranged longitudinally and transversely in the sliding plate,
    wherein in a first mode of operation, the sliding plate is slidable over the base in the longitudinal or transverse directions of the base while the planar surface of the sliding plate faces the planar surface of the base, the plurality of guides facilitates the sliding plate to slide over the respective longitudinal and transverse directions of the base by guiding the first joint to run along the longitudinal and transverse arrangements of the plurality of guides when the sliding plate is slid over the base,
    wherein in a second mode of operation, the sliding plate is substantially slid over the base to a position in the transverse direction of the base, the sliding plate is pivotable about the longitudinal edge of the base to a configuration such that the planar surface of the sliding plate forms an oblique angle relative to the planar surface of the base, the revolving member being adapted to revolve and project from the base when the sliding plate is pivoted into the configuration.

2. The hinge mechanism as claimed in claim 1, wherein the plurality of guides comprises
    a first rail located adjacent to a longitudinal side of the sliding plate and extending longitudinally in the sliding plate; and
    a second rail located adjacent to a transverse side of the sliding plate and extending orthogonally from the first rail.

3. The hinge mechanism as claimed in claim 2, the hinge mechanism further comprising:
    a second joint for coupling the sliding plate to the base, the second joint being adapted to be guided by the second rail when the hinge mechanism is sliding between two configurations.

4. The hinge mechanism as claimed in claim 3, wherein the second rail terminates with an opening at an edge of the sliding plate, the sliding plate being substantially slid over the base in the transverse direction of the base when the second joint is slide out of the second rails to the opening, and the opening being sufficiently wide so that the joint will not obstruct tilting of the sliding plate.

5. The hinge mechanism as claimed in claim 3, wherein the second joint is biased to resiliently hold the sliding plate and the base together.

6. The hinge mechanism as claimed in claim 1, wherein the dampener comprises one or more abutment members residing in the base, the one or more abutment members being arranged to resiliently press against a side of the revolving member to restrain its revolving movement when the sliding plate is pivoted into the configuration.

7. The hinge mechanism as claimed in claim 6, wherein the revolving member comprises one or more slots, and each abutment member comprises an abutting head, the abutting head being adapted for pressing resiliently against the revolving member and for sitting in the one or more slots to stop further revolving movement when the revolving member is substantially revolved.

8. The hinge mechanism as claimed in claim 7, wherein each of the one or more slots are so shaped to block further revolving movement when the revolving member is substantially revolved, and to guide the revolving member to revolve back to a configuration where the sliding plate is not pivoted.

9. The hinge mechanism as claimed in claim 1, wherein the revolving member comprises one or more side members for fitting on one or more corresponding guiding portions located in the base to guide the revolving movement of the revolving member when the revolving member revolves and projects from or is pushed back into the base.

10. The hinge mechanism as claimed in claim 1, the hinge mechanism further comprising:
    a follower arm comprising an elongated apertured centre and a first end coupled to the joint,
    the follower arm being adapted to hoop over a protrusion on the sliding plate such that the protrusion is inserted into the elongated apertured centre,
    the follower arm being further adapted to rotate about the joint, and the protrusion of the sliding plate being adapted to slide along the elongated apertured centre when the sliding plate slides over the base along the longitudinal or transverse directions of the base.

11. The hinge mechanism as claimed in claim 1, wherein the first joint is biased to resiliently hold the sliding plate and the revolving member together.

12. The hinge mechanism as claimed in claim 1, wherein the joint comprises
    a cam portion;
    one or more biasing means; and
    a teeth portion coupled to the one or more biasing means,
    the cam portion being arranged to brush against the teeth portion at the time the sliding plate is sliding along the longitudinal or transverse directions of the base while facing the base,
    the one or more biasing means being arranged to urge resilient movement of the sliding plate according to the profiles of the cam portion and the teeth portion.

13. A portable device comprising the hinge mechanism as claimed in claim 1.

* * * * *